United States Patent
Adams

(10) Patent No.: US 9,849,720 B1
(45) Date of Patent: Dec. 26, 2017

(54) SYSTEM AND METHOD FOR DISPLAYING ARTWORK

(71) Applicant: Paul Adams, Tucson, AZ (US)

(72) Inventor: Paul Adams, Tucson, AZ (US)

( * ) Notice: Subject to any disclaimer, the term of this patent is extended or adjusted under 35 U.S.C. 154(b) by 0 days.

(21) Appl. No.: 15/213,221

(22) Filed: Jul. 18, 2016

Related U.S. Application Data

(60) Provisional application No. 62/231,807, filed on Jul. 16, 2015.

(51) Int. Cl.
  *B60B 7/00* (2006.01)
  *B65C 9/26* (2006.01)
  *B44C 1/17* (2006.01)
  *G09F 3/10* (2006.01)

(52) U.S. Cl.
  CPC .......... *B60B 7/0053* (2013.01); *B44C 1/1733* (2013.01); *B65C 9/26* (2013.01); *G09F 3/10* (2013.01); *B60B 2310/318* (2013.01); *B60B 2310/614* (2013.01); *B60B 2360/10* (2013.01); *B60B 2360/32* (2013.01); *B60B 2360/36* (2013.01); *B60B 2360/50* (2013.01); *B60B 2360/90* (2013.01); *B60B 2900/572* (2013.01)

(58) Field of Classification Search
  CPC ... B60B 7/00; B60B 7/0053; B60B 2310/318; B60B 2310/614; B60B 2310/616; B60B 2360/32; B60B 2360/36; B60B 2360/50; B60B 2360/90; B60B 2900/572; B65C 9/18; B65C 9/1807; B65C 9/1811; B65C 9/26; B65C 9/36; B44C 1/16; B44C 1/17; B44C 1/1712; B44C 1/1733; G09F 3/10
  USPC ....... 428/43, 195.1, 230, 233, 234; 156/230, 156/233, 234, 43, 195.1
  See application file for complete search history.

(56) References Cited

U.S. PATENT DOCUMENTS

| | | | |
|---|---|---|---|
| 4,839,206 A | * 6/1989 | Waldenberger | C09J 7/0207 427/208 |
| 5,058,959 A | * 10/1991 | Miles | G09F 3/00 283/81 |
| 2007/0228807 A1 | 10/2007 | Leslie et al. | 301/37.26 |
| 2015/0047196 A1 | 2/2015 | Hansen et al. | 29/894.38 |

FOREIGN PATENT DOCUMENTS

WO      03/037649      * 8/2003

* cited by examiner

*Primary Examiner* — Bruce H Hess

(57) ABSTRACT

A design mount includes a design cutout having a design printed or adhered to the design surface and an adhesive tape on the back of the design cutout to mount the design cutout to any design surface. A plurality of design cutouts may be printed on a single sheet of material, and the design cutouts then cut out of the sheet. The design mount may also provide an artwork holder, having a shape that matches the shape of the design cutout. The inner perimeter of the holder may be about 1 mm smaller than the outer perimeter of the design cutout. The artwork holder may be heated, and the design cutout secured within the holder while the holder is heated. The holder then cools, providing a tight fit of the design cutout within the artwork holder.

9 Claims, 4 Drawing Sheets

SYSTEM AND METHOD FOR DISPLAYING ARTWORK

CROSS REFERENCE TO RELATED APPLICATION

This application claims priority of U.S. Provisional No. 62/231,807, filed Jul. 16, 2015, which is hereby incorporated by reference in its entirety.

BACKGROUND OF THE INVENTION

Field of the Invention

The invention relates to mounting and displaying artwork. The invention has particular utility for use in mounting and displaying artwork on motor vehicle hubcaps and/or added on to O.E. steel or aluminum wheels without modifying or removing the wheel and will be described in connection with such utility, although other utilities are contemplated.

Description of Related Art

A hubcap covers at least the central portion of an automobile's wheel. Automobiles are sold with hubcaps which are typically standard for the make and model. The hubcaps serve to protect the wheel, metal rim of the wheel and lug nuts, as well as enhance the car's appearance. Hubcaps frequently bear designs and indicia for ornamental effect. An existing problem for automobile owners occurs when the automobile owner wishes to change or ornament their existing hubcaps in order to have different designs on their wheels.

Previous options for interchanging hubcaps to tires required replacing the entire hubcap. Replacing the hubcap required extensive time input as well as the proper tools, typically a lug wrench or a screw driver. Further, the automobile owner did not have the option of replacing a portion of the hubcap. The process of replacing the existing hubcap/wheels entailed removing the screws holding it in place, unsnapping the hubcap from the tire rim, or wrenching loose approximately six lug nuts holding it in place. No mechanism for replacing a portion of a hubcap existed. Another option was to take the car to a mechanic and pay someone to replace the hubcaps. However, this option was expensive, inconvenient, and even more time consuming.

In addition to customizing hubcaps, art owners increasingly desire to display their art in a variety of place and ways. Artwork may be mounted on walls, appliances, cars bodies, furniture, clothing, hats, shoes, and other surfaces. Designs are frequently used on pins, desktop accessories, clocks, carpets, replica baseballs or replica footballs and a whole assortment of sports memorabilia. Many individuals will mount flags or place bumper stickers on their vehicle to display a particular design. Also seat covers may be placed in the vehicle or other decorative means to showcase a preferred design.

Designs can be in black and white or colored and may include company or other logos, numbers, insignias, seals, flags, personal information, personal or other photos, commercial information, team colors, pennants, astrological signs, or any other rendering that can be drawn, printed or typed.

A customized artwork attachment system to provide interchangeable designs to allow use of different ornamental adornments for different occasions and a customized artwork attachment kit is therefore needed.

So as to reduce the complexity and length of the Detailed Specification, and to fully establish the state of the art in certain areas of technology, Applicant(s) herein expressly incorporate(s) by reference all of the following materials identified in each numbered paragraph below. The incorporated materials are not necessarily "prior art" and Applicant(s) expressly reserve(s) the right to swear behind any of the incorporated materials.

U.S. Publication No. 2015/0047196 to Albert Hansen et al.

U.S. Publication No. 2007/0228807 to Jerry Leslie et al.

Applicant(s) believe(s) that the material incorporated above is "non-essential" in accordance with 37 CFR 1.57, because it is referred to for purposes of indicating the background of the invention or illustrating the state of the art. However, if the Examiner believes that any of the above-incorporated material constitutes "essential material" within the meaning of 37 CFR 1.57(c)(1)-(3), applicant(s) will amend the specification to expressly recite the essential material that is incorporated by reference as allowed by the applicable rules.

Additional advantages of the invention will be set forth in part in the description which follows, and in part will be obvious from the description, or may be learned by practice of the invention. The advantages of the invention may be realized and attained by means of the instrumentalities and combinations particularly pointed out in the appended claims. Further benefits and advantages of the embodiments of the invention will become apparent from consideration of the following detailed description given with reference to the accompanying drawings, which specify and show preferred embodiments of the present invention.

BRIEF SUMMARY OF THE INVENTION

The present invention provides among other things a design mount consisting of a design cutout having a design printed or adhered to the design surface and an adhesive tape on the back of the design cutout to mount the design cutout to any design surface. A plurality of design cutouts may be printed on a single sheet of material, and the design cutouts then cut out of the sheet. The design mount may also provide an artwork holder, having a shape that matches the shape of the design cutout. The inner perimeter of the holder may be about 1 mm smaller than the outer perimeter of the design cutout. The artwork holder may be heated, and the design cutout secured within the holder while the holder is heated. The holder then cools, providing a tight fit of the design cutout within the artwork holder.

It is an object of the invention to provide a generalized design mount that will work with a wide variety of designs and mounting surfaces.

It is another object of the invention to provide a customized hubcap attachment system.

It is another object of the invention to provide ease in interchangeability of ornamental hubcaps.

It is another object of the invention to decorate wheel center caps.

It is another object of the invention to provide flexibility to have many different hubcaps/wheels with designs for different occasions.

It is another object of the invention to provide ease in replacement of portions of hubcaps.

It is another object of the invention to provide a way to display a customized design on an existing surface.

It is another object of the invention to provide a more durable way of displaying a design or artwork.

It is another object of the invention to provide a mounting system that will work with a wider variety of mounting surfaces.

The above and other objects may be achieved using devices involving a design mount comprising a design cutout having a design surface and a back surface, wherein a design is printed or adhered to the design surface. In a particular embodiment, the design is laser printed onto the design cutout. A plurality of design cutouts may be printed on a single sheet of material, and the design cutouts then cut out of the sheet. The sheet may be selected from acrylic, plastic, rubber, wood, metal, vinyl, or some combination of materials. In a particular embodiment, the sheet is UV resistant acrylic material. A piece of two-sided adhesive tape is adhered to the back surface of the design cutout, having a backing or cover on the tape.

The design mount may also provide an artwork holder, having a shape that matches the shape of the design cutout. The artwork holder may be formed of a plastic, silicon, rubber, polyvinyl chloride, acrylic, metal, fiber, or a combination of materials. The inner perimeter of the holder may be about 1 mm smaller than the outer perimeter of the design cutout. The artwork holder may be heated, and the design cutout secured onto the holder flange while the holder is heated. The holder then cools, providing a tight fit of the design cutout within the artwork holder.

The above and other objects may be accomplished using a kit for mounting a design to a mounting surface. The kit includes a design cutout, an artwork holder, and a strip of two sided adhesive tape. The inner perimeter of the holder may be about 1 mm smaller than the outer perimeter of the design cutout and the user may be directed to heat the artwork holder, for example in a container of hot water. The design cutout may then be secured within the holder while the holder is heated. The holder then cools, providing a tight, weather and environment resistant fit of the design cutout within the artwork holder. The user then would be directed to remove the backing from one surface of the two-sided adhesive tape and secure the tape to the back surface of the design cutout. The user then removes the backing from the other side of the two-sided adhesive tape and mounts the design to the desired mounting surface.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts.

BRIEF DESCRIPTION OF THE SEVERAL VIEWS OF THE DRAWINGS

A more complete understanding of the present invention may be derived by referring to the detailed description when considered in connection with the following illustrative figures. In the figures, like reference numbers refer to like elements or acts throughout the figures.

Figure 1:
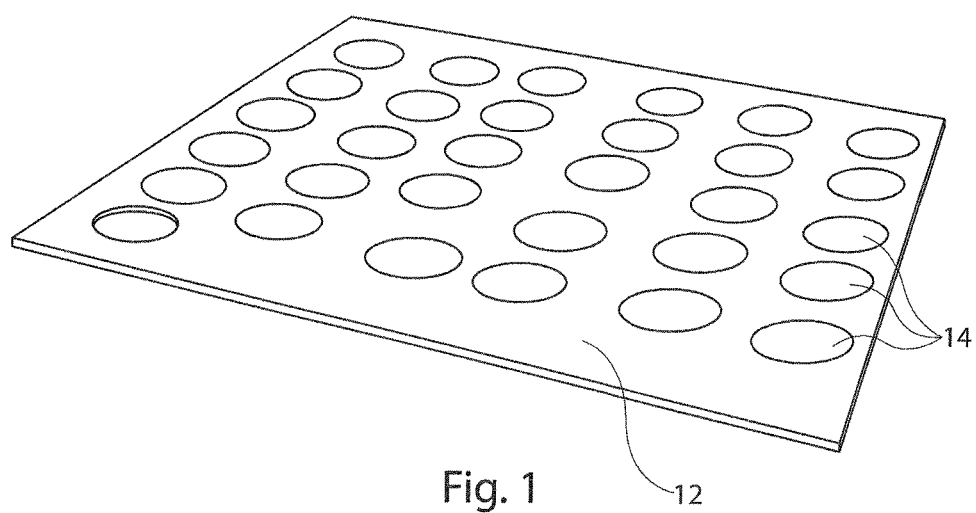
FIG. 1 depicts a perspective view of a sheet of material with a plurality of design cutouts marked on the sheet.
Figure 2:
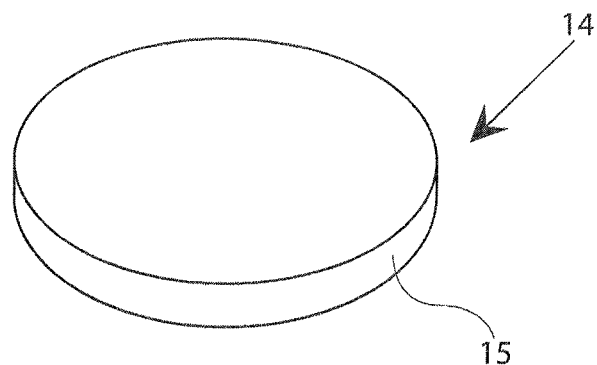
FIG. 2 depicts a perspective view of a design cutout of the invention.
Figure 3:
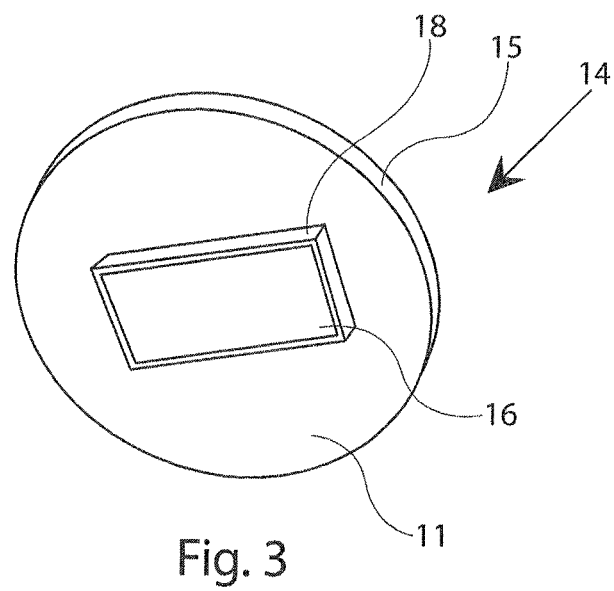
FIG. 3 depicts a perspective view of the back surface of the design cutout of FIG. 2.
Figure 4:
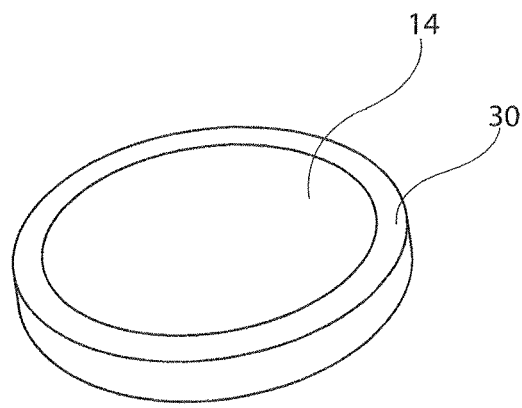
FIG. 4 depicts a perspective view of a design cutout in an artwork holder
Figure 5:
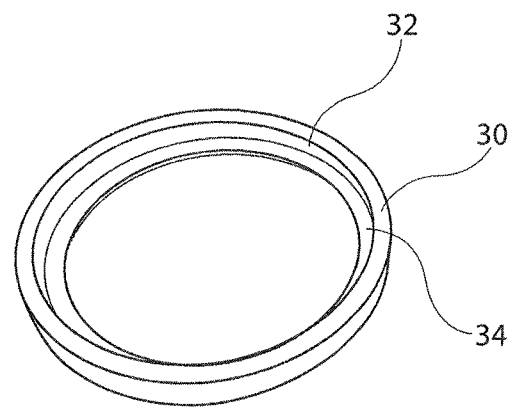
FIG. 5 depicts a perspective view of an artwork holder.
Figure 6:
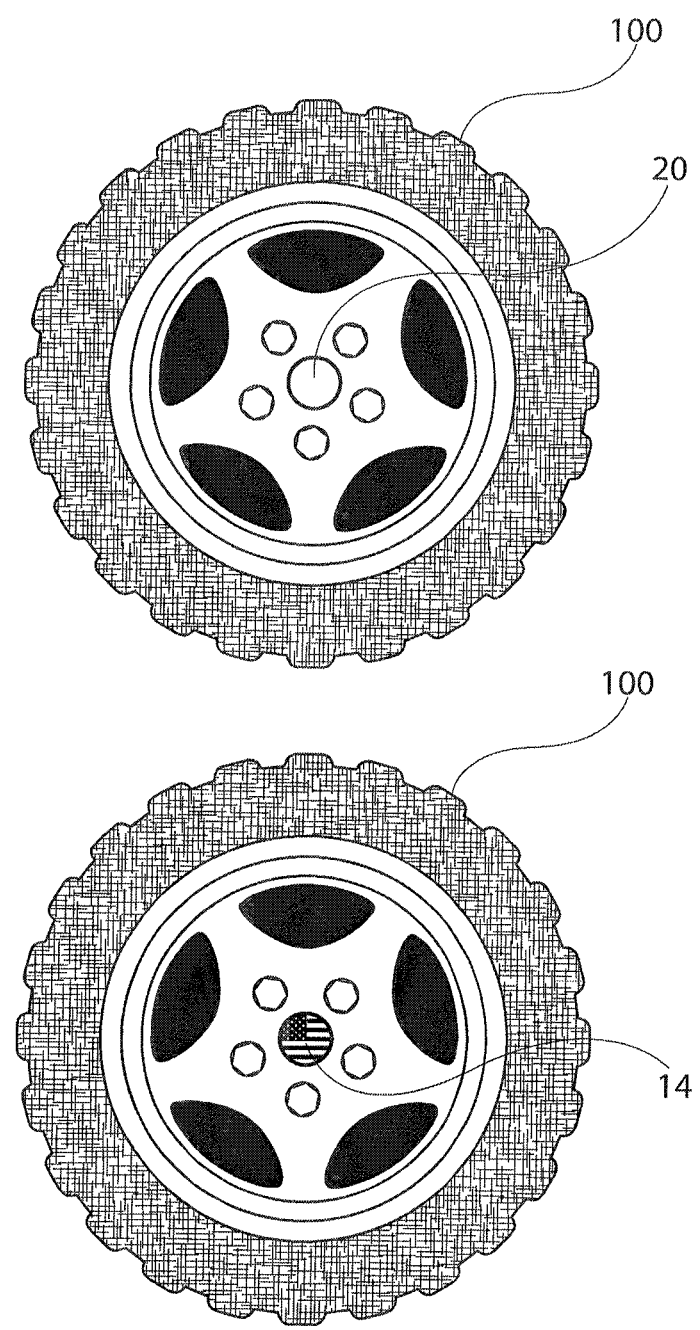
FIG. 6 is a direct view of a design cutout mounted on a particular mounting surface.

Elements and acts in the figures are illustrated for simplicity and have not necessarily been rendered according to any particular sequence or embodiment.

DETAILED DESCRIPTION OF THE INVENTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention. It should be noted that there are many different and alternative configurations, devices and technologies to which the disclosed inventions may be applied. The full scope of the inventions is not limited to the examples that are described below.

In one application of the invention, artwork is printed onto a durable design surface 10. The design surface 10 may be on a sheet 12 of clear or opaque plastic, acrylic, rubber, wood, metal, vinyl, or a combination of materials. In a particular embodiment, the design surface 10 is on a sheet 12 of a sturdy and UV resistant acrylic material.

In a particular embodiment, many copies of a single image or design are printed onto a single sheet 12 of material. The individual copies may then be cut out of the sheet 12 as an individual design cutout 14. The shape of the design cutout 14 may be a circular disc, a square or rectangle, a triangle, or any other desired shape to fit the design or the desired mounting surface 20 of the design. The design cutout 14 may be irregularly shaped, such as the shape of the continental United States, or the shape of the state of Texas. In a particular embodiment, the design cutout 14 is a 55 mm diameter disc sized to fit in the center of a hub cap 100.

The design may be mounted to a mounting surface 20 by any method known in the art, including adhesive tape, glue, screws, magnets, lacquer, soldering or other method. In a particular embodiment, the design cutout includes a strip of tape 16 adhered to the back surface 11 of the design cutout 14 opposite to the design surface 10. In a particular embodiment, the tape 16 is double sided polyurethane tape model 4026, manufactured by 3M. One side of the tape is adhered to the back surface 11, and the other side of the tape 16 is covered by a release sheet or cover 18 until the design cutout 14 is ready to be applied to the mounting surface 20. While the design cutout 14 may be mounted to any mounting surface 20, the mounting surface 20 is preferably flat or slightly curved over the area on which the design cutout 14 is to be mounted.

In practice, the user can select among a variety of existing designs or may choose to use a customized design provided by the user. The design is then printed onto the sheet 12 of material and the design cutouts 14 are cut from the sheet 12. Each design cutout 14 is given a strip of tape 16 adhered to the back surface 11 of the design cutout 14. When the design cutout 14 is desired to be mounted to the mounting surface 20, the mounting surface 20 is washed, and cleaned with a supplied alcohol swab and allowed to dry. The user then removes the cover 18 from the tape 16 on the design cutout 14, and presses the design cutout firmly onto the mounting surface 20.

In some embodiments, the design cutout 14 is framed by a holder 30. In a particular embodiment, the holder 30 is injection molded ADS plastic. The ADS plastic may be clear, opaque, a single color, or a combination of colors. The holder 30 is shaped to match the design cutout 14 and has an insider perimeter 32 that is approximately 1 mm smaller than the outside perimeter 15 of the design cutout 14.

The holder 30 includes a flange 34. The flange is on the back side of the holder. The flange may be dimensioned so that the tape 16 is the same thickness as the flange 34 so that the tape 16 is flush with the back side of the holder 34 when the design cutout 14 is in the holder 30. Once formed, the holder 30 may be heated to expand the holder 30 and make the holder 30 more pliable. The holder 30 may be heated by placing the holder 30 in hot water for a period of time. In a particular embodiment, the holder 30 is place in hot (but not boiling) water for approximately 30 seconds. The design cutout 14 may then be inserted into the holder 30, and the combined design cutout 14 and holder 30 may be mounted to the mounting surface 20.

I claim:

1. A design mount system comprising
    a design cutout having a design surface, a back surface and an outer perimeter, wherein a design is printed or adhered to the design surface and wherein the outer perimeter has a shape;
    a holder having an inner perimeter shaped to match the shape of the outer perimeter of the design cutout wherein the design cutout is accommodated within the holder; and
    a piece of two-sided adhesive tape on the back surface of the design cutout, wherein one side of the adhesive tape is adhered to the back surface of the design cutout and a cover is over the opposite side of the adhesive tape.

2. The design mount system of claim 1, wherein the holder is formed of a material selected from the group consisting of plastic, silicon, rubber, polyvinyl chloride, acrylic, metal, fiber, or a combination.

3. The design mount system of claim 1, wherein the inner perimeter of the holder is about 1 mm smaller than the outer perimeter of the design cutout.

4. The design mount system of claim 1, wherein the design cutout is cut from a sheet of material.

5. The design mount system of claim 1, wherein the material is selected from the group consisting of acrylic, plastic, rubber, wood, metal, vinyl, or a combination.

6. The design mount system of claim 5, wherein the material is UV resistant acrylic.

7. The design mount system of claim 1, wherein the design is laser printed onto the design cutout.

8. A kit for mounting a design to a mounting surface, the kit comprising:
    a design cutout having a design surface, a back surface and an outer perimeter, wherein the design is printed or adhered to the design surface and wherein the outer perimeter has a shape;
    a holder having an inner perimeter shaped to match the shape of the outer perimeter of the design cutout wherein the design cutout is accommodated within the holder; and
    a piece of two-sided adhesive tape on the back surface of the design cutout, wherein one side of the adhesive tape is adhered to the back surface of the design cutout and a cover is over the opposite side of the adhesive tape.

9. The kit of claim 8 wherein the inner perimeter of the holder is about 1 mm smaller than the outer perimeter of the design cutout and wherein the design cutout may be secured in the holder by heating the holder, setting the design cutout in the holder and allowing the holder to cool.

\* \* \* \* \*